Aug. 16, 1932.                G. KEUL                1,871,705
                             HEATED TRAY
                          Filed July 10, 1929

Inventor
Gottfried Keul
By Wheeler, Wheeler & Wheeler
Attorneys

Patented Aug. 16, 1932

1,871,705

UNITED STATES PATENT OFFICE

GOTTFRIED KEUL, OF DOVER, OHIO

HEATED TRAY

Application filed July 10, 1929. Serial No. 377,098.

This invention relates to improvements in heated trays.

It is the object of the invention to provide a novel and improved form of tray, preferably a portable tray, having a substantially flat surface adapted to receive various dishes and the like containing food, and certain depressions into which containers for food are receivable to be kept warm at a temperature proper for the food therein contained. The use of electrical heating elements associated directly with the bottoms of the recesses in the tray makes it possible to heat to the required temperature the contents of food containers disposed in such recesses while avoiding any undue rise in the temperature of the general surface of the tray.

The arrangement described has great advantage over any existing tray constructions, whether portable or not. It is one of my purposes, however, to provide a great additional advantage in a portable tray, in that a tray made in accordance with this invention will be relatively cheap and very light in comparison with any other known means of keeping foods warm over a period of time.

It is desired to differentiate the present invention from any cooking appliance. It is my purpose to provide only a sufficient quantity of heat to maintain food at edible temperatures without overheating the food, cooking it, or burning it.

In the drawing.

Like parts are identified by the same reference characters throughout the several views.

Figure 1:
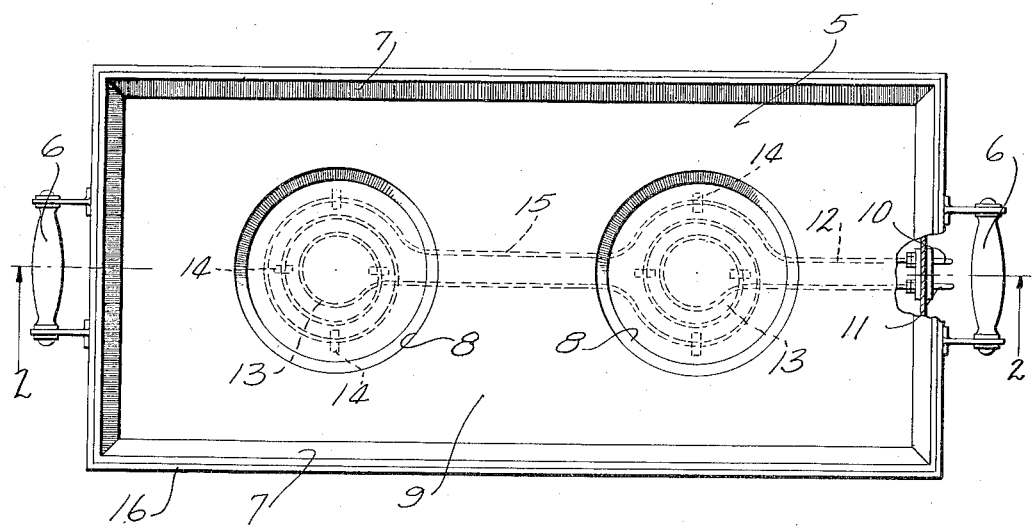
Figure 1 is a plan view of a tray embodying this invention.
Figure 2:
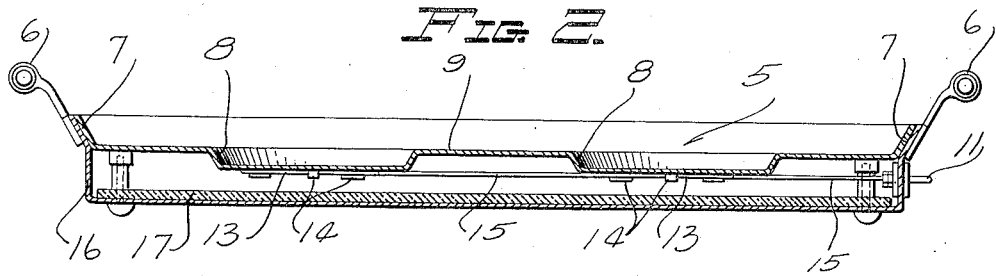
Figure 2 is a detail view showing the tray in the section indicated by the line 2—2 in Fig. 1.

I have chosen for the purpose of the present disclosure to illustrate a portable tray, since such a tray has advantages in addition to those which are found in the use of the invention for fixed trays.

The tray 5 may take any desired form according to the number and disposition of the recesses therein which are to be provided with heat. As illustrated, the tray is rectangular and is provided at its ends with handles 6 for convenient lifting. Being portable, it preferably has a marginal rim or flange 7 which not only prevents dishes from slipping from the tray, but also adds rigidity to the assembly.

While the general construction of the tray is broadly immaterial, it will be noted that I have provided therein a plurality of recesses or depressions 8, which are preferably formed integrally with the surface of the tray and are adapted to be heated. Dishes of food placed in the recesses 8 will thus be kept warm whereas dishes placed on the broad and preferably plane surface 9 of the tray will be substantially wholly unheated, due to the use of electrical heating means remote from the plane surface.

Terminals are provided at 10 and 11 and are connected by a conductor 12 which, as a whole, will offer sufficient resistance to keep the flow of current therethrough within the desired limits. The conductor, or electrically resistant portions thereof, are coiled at 13 in close proximity to the bottoms of the recesses 8, being held thereto by the clips 14. It is possible to make the entire conductor coil of some such resistance wire as the well known nichrome element, suitably insulated by an asbestos sheath. The coils 13 concentrate heat developed by the resistance of the wire upon the bottoms of recesses 8, while the fact that the intervening connecting strands 15 are wholly remote from the supporting surface of the tray, renders such connecting strands relatively ineffective to heat food containers placed on the plane surfaces 9.

A base is provided for the tray, and an enclosure for the heating element 12, by a pan-shaped case 16 fastened beneath the tray and protected from radiated heat by means of a pad 17 of asbestos or some similar incombustible material having a thermal insulating value.

In use the tray may stand upon the base provided therefor on a table or the like, or it may be held on the lap of an invalid while the contents of dishes on the tray are eaten. Obviously, it is possible in the use of trays made in accordance with the disclosure herein, to prepare meals according to the requirements of individual invalids well in advance of meal time, and to keep certain dishes warm while other dishes will be substantially unheated until it is time for the meal to be served. The tray may then be disconnected from the source of electrical current at the point where the material is prepared, and may again be connected to a source of electrical current to keep the same dishes warm while the food therein is being consumed. The weight of this tray will not be appreciably greater than the weight of a tray which does not have the heating feature. The box-like construction reinforces the tray to such a degree that it may be made, if desired, of much lighter material than would be employed in the construction of an ordinary tray. This is a great convenience in situations where the tray must be held on the lap of the person who eats from the dishes thereon. It will be noted that the means employed for heating selected areas of the tray does not add materially to the weight.

It is obviously immaterial in any broad sense what materials are employed in the construction of the device herein disclosed. Preferably the tray 9 is made of metal, not only for reasons of economy, but also for reasons of sanitation. The metal can readily be formed and is easily washed. Preferably the tray is formed in one piece to provide the recesses or depressions at 8, but at least it should be integral in the sense that if the depressed portions are separately formed they should be soldered, brazed or welded to the body of the tray to make a joint such that neither water nor food can reach the heating element.

Although the tray is preferably made of metal, it may also be made of fibre or other material if desired, due to the comparatively low temperatures employed.

I claim:

1. A device of the character described comprising a portable light weight tray having a continuous dish-supporting surface provided with a plurality of depressions, a shield enclosing the bottom of the tray and the depressions therein and spaced from the tray and said depressions at all points except at its margins, where it is connected with the tray, electrical terminals mounted upon said shield at substantially the level of the depressions in the tray and substantially planiform wiring extending from said connections to the under surfaces of the several depressions and provided at such under surfaces with resistance portions in intimate contact with the depressed areas of the tray, the wiring being spaced from other portions of the tray by its connection with said contacts and by the depressed areas of the tray whereby only such depressed areas are heated and the remaining dish supporting areas of the tray are substantially unheated.

2. A portable tray comprising the combination with a plate providing a continuous dish-supporting surface having a dish-receiving depression, of electric terminals provided with means supporting them below said plate, clips on said plate at the bottom of said depression, and a resistance element continuous from one of said terminals to the other and having a coil supported by said clips in intimate contact with the depression of said plate, intermediate portions of said resistance element being spaced from said plate.

3. A light-weight portable tray comprising a plate having an integrally continuous supporting surface, means for the support of electrical terminals, terminals mounted in said means, an insulated resistance element connected with said terminals and having convolutions concentrated beneath a predetermined area of said plate, and means mechanically connecting the convoluted portion of said element directly to the registering portions of said plate, the portions of said element intervening between said convoluted portion and said terminal being spaced from said plate, whereby to avoid heat transmission to said plate except at said area.

4. A portable light weight tray comprising a plate having a plurality of dish-receiving depressions, electrical terminal-supporting means connected with said plate, electrical terminals carried by said supporting means, a resistance element continuous from one of said terminals to the other and provided integrally with coiled portions registering with the depressions of said plate, and means for mechanically connecting said coiled portions to the depressed portions of said plate, whereby to support intervening portions of said resistance element free of said plate while maintaining said element in intimate heat delivering relation to said depressed portions.

GOTTFRIED KEUL.